Feb. 11, 1947.    A. BARABINO    2,415,668
TURBO GAS SAVER
Filed April 9, 1945
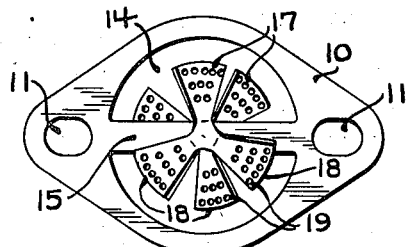
FIG. 1.
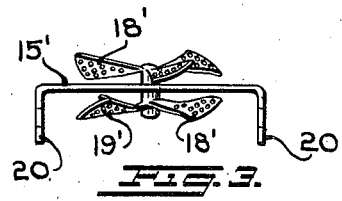
FIG. 3.
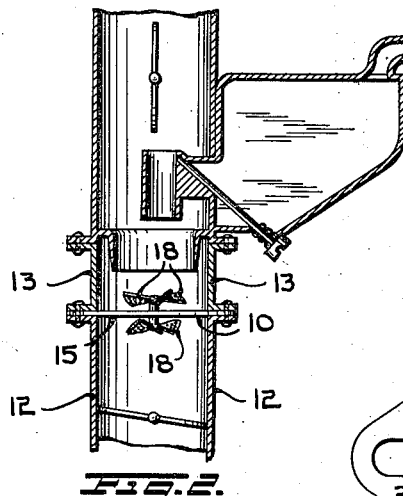
FIG. 2.
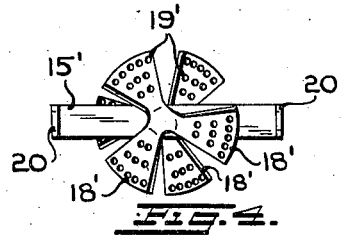
FIG. 4.
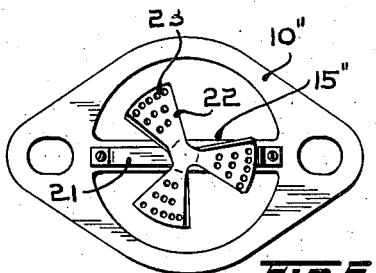
FIG. 6.
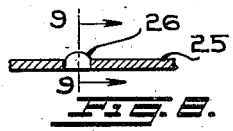
FIG. 8.
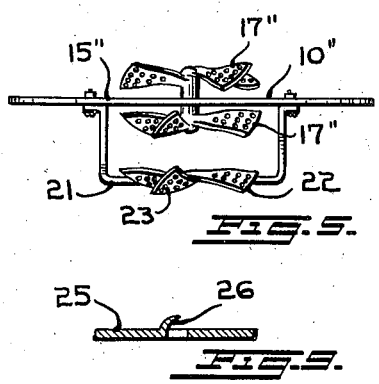
FIG. 5.
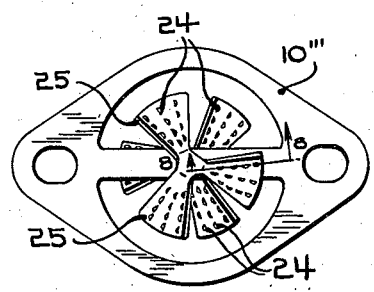
FIG. 7.
FIG. 9.
INVENTOR.
ALFRED BARABINO
BY
ATTORNEY.

Patented Feb. 11, 1947

2,415,668

UNITED STATES PATENT OFFICE 2,415,668

TURBO GAS SAVER

Alfred Barabino, New York, N. Y.

Application April 9, 1945, Serial No. 587,283

1 Claim. (Cl. 48—180)

This invention relates to a turbo gas saver.

More specifically, the present invention relates to new and useful improvements in a rotary vaporizer for use in the fuel line of a gasoline type internal combustion engine to increase the mileage and power of the engine per gallon of gasoline.

Still further it is proposed to provide a gas saver as aforesaid having two rotary fans integrally connected with their blades staggered, the blades being similarly pitched, and provided with vaporizing holes.

Another object is to provide a gas saver as aforesaid having, in line with the rotary fans, a stationary diffuser of similar construction to the rotary fans.

Still further, it is proposed to provide a gas saver of the aforesaid types having sharply cut holes provided with sharp prongs at one edge for intercepting the gas and ripping it for vaporization.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 is a plan view of a device constructed in accordance with this invention.

Fig. 2 is a side view of the device of Fig. 1, fuel inlet pipes being shown fragmentally in section.

Fig. 3 is a side view of a device constructed in accordance with a modification of this invention.

Fig. 4 is a plan view of the device of Fig. 3.

Fig. 5 is a side view of a device constructed in accordance with a further modification of this invention.

Fig. 6 is an inverted plan of the device of Fig. 5.

Fig. 7 is a plan view of still another device.

Fig. 8 is an enlarged section on the line 8—8 of Fig. 7.

Fig. 9 is a section on the line 9—9 of Fig. 8.

The turbo gas saver of the present invention is to vaporize liquid gasoline in the air-gasoline mixture of an internal combustion engine, or to more completely disintegrate it for vaporization, the mixture being the usual mixture ejected through the carburetor of an automobile or similar power plant.

The device, according to this invention, comprises a bracket 10 having holes 11 adapting it to be bolted between two pipe sections 12 and 13 of a fuel inlet manifold of an internal combustion engine. The bracket has a central orifice 14 through which the mixture passes, this orifice being bridged by a support 15. A shaft 16 is journalled in the middle of the support 15 and a disintegrating or vaporizing fan 17 is mounted on each end of the shaft, one on either side of the support 15. The two fans 17 are similar but are rigidly secured to the shaft 16 in staggered relation so that their blades are not in alignment. Each fan has three blades 18 and the blades of the two fans are similarly pitched. Each blade is provided with a large number of closely positioned circular holes 19.

The operation of the device is as follows:

When inserted in a fuel pipe, for instance before a carburetor, the fans are rotated in response to the depression created in the engine cylinders at the beginning of each cycle. On rotating, the fluid passing through the pipes is drawn by the blades and must pass therearound and through the holes 19, the holes serving to disintegrate the fluid and enable it to more completely vaporize.

The device of Figs. 3–4, constructed in accordance with a modification of this invention, distinguishes from the device of Fig. 1 in that the fans are journalled in a support 15' having flanges 20 provided with orifices for bolting the support in a pipe. Other parts of this device corresponding to similar parts of the device of Fig. 1 are indicated by like references with an accent added.

A device constructed in accordance with a further modification of this invention is shown in Figs. 5–6. It distinguishes from the device of Fig. 1 in that a depending support 21 is bolted to support 15'' and a stationary disintegrator vane 22 is secured to this support 21 in line with the fans 17''. Vane 22 is similar in shape to the fan 17'' and has holes 23. The blades of the vane 22 are pitched similar to the pitch of the blades of fan 17''.

A device constructed in accordance with a further modification of the invention is shown in Figs. 7–9. It distinguishes from the device of Fig. 1 only in that the holes 24 of the blades 25 are stamped out to provide, along one edge of each hole, a sharp upstanding prong 26 which rips the air-gasoline mixture, assisting disintegration.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

The combination with the flanged fuel intake pipes of an automotive engine, of a support disc member secured between the pipe flanges and shaped to provide an opening concentric with said pipes, a bridge formed integrally with said disc and extending diametrically across said opening, a substantially U-shaped support bracket depending from and in alignment with the bridge portion of said support disc, a shaft journalled in the bridge axially of the fuel passage formed by said pipes, fans mounted on the opposite ends of said shaft and positioned above and below said bridge portion for rotation as a pair with said shaft, each of said fans having spaced perforated blades pitched for rotation in the same direction, the blades of one fan being offset with respect to the blades of the other fan, a disintegrator vane fixedly mounted on said bracket axially of said fan shaft and presenting perforated blades pitched to direct the flow of fuel toward said fans and the perforations of said blades being formed to provide about a portion of the periphery of each hole an upstanding prong for assisting in the fuel disintegrating action of said fans.

ALFRED BARABINO.

REFERENCES CITED

The following references are of record in the file of this patent:

UNITED STATES PATENTS

| Number | Name | Date |
|---|---|---|
| 1,700,895 | Keller | Feb. 5, 1929 |
| 1,578,262 | Campbell | Mar. 30, 1926 |
| 1,453,656 | Bonnell | May 1, 1923 |
| 1,450,550 | Hudson | Apr. 3, 1923 |
| 1,132,351 | Jenkins | Mar. 16, 1915 |

FOREIGN PATENTS

| Number | Country | Date |
|---|---|---|
| 107,897 | British | July 19, 1917 |